(12) United States Patent
Watanabe

(10) Patent No.: US 9,309,942 B2
(45) Date of Patent: Apr. 12, 2016

(54) VIBRATION DAMPING DEVICE HAVING STOPPER RUBBERS

(71) Applicant: TOKAI RUBBER INDUSTRIES, LTD., Aichi (JP)

(72) Inventor: Hiroyuki Watanabe, Gifu (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 295 days.

(21) Appl. No.: 13/938,424

(22) Filed: Jul. 10, 2013

(65) Prior Publication Data

US 2014/0084526 A1    Mar. 27, 2014

(30) Foreign Application Priority Data

Sep. 27, 2012 (JP) ................................. 2012-213446

(51) Int. Cl.
F16F 7/00 (2006.01)
F16F 1/37 (2006.01)
F16F 1/371 (2006.01)

(52) U.S. Cl.
CPC . *F16F 1/37* (2013.01); *F16F 1/371* (2013.01); *F16F 2230/007* (2013.01)

(58) Field of Classification Search
CPC ......... F16F 7/00; F16F 1/3849; F16F 1/3735; F16F 2230/007
USPC .................................. 267/141, 141.1, 141.2
See application file for complete search history.

(56) References Cited

U.S. PATENT DOCUMENTS

| 7,111,705 B2 * | 9/2006 | Ohta et al. ..................... 180/312 |
| 8,157,251 B2 * | 4/2012 | Tanaka et al. ................. 267/141 |
| 2002/0180129 A1 * | 12/2002 | Frobisher et al. ........ 267/140.11 |

FOREIGN PATENT DOCUMENTS

| JP | 2-2659678 | 9/1997 |
| JP | 2659678 | 9/1997 |
| JP | 2005-048838 | 2/2005 |
| JP | 2007-255530 | 10/2007 |
| JP | 2008-196508 | 8/2008 |
| JP | 2009-243666 | 10/2009 |
| JP | 2012-087894 | 5/2012 |

* cited by examiner

*Primary Examiner* — Robert A Siconolfi
*Assistant Examiner* — Mahbubur Rashid
(74) *Attorney, Agent, or Firm* — Greenblum & Bernstein, P.L.C.

(57) ABSTRACT

A vibration damping device having stopper rubbers including: a first and second mounting members; an outer bracket attached to the second mounting member; and a plurality of stopper rubbers attached to the outer bracket and providing a stopper mechanism for limiting an amount of relative displacement between the first and second mounting members by means of contact between a first mounting member side and the outer bracket via the stopper rubbers. The stopper rubbers include respective mating recesses and the mating recesses open toward a same direction. The stopper rubbers are integrally connected by at least one rubber connecting portion. The stopper rubbers are attached to the outer bracket with the rubber connecting portion being deformed so that the mating recesses are arranged so as to open toward different directions and are mated with the outer bracket.

11 Claims, 10 Drawing Sheets

VIBRATION DAMPING DEVICE HAVING STOPPER RUBBERS

INCORPORATED BY REFERENCE

The disclosure of Japanese Patent Application No. 2012-213446 filed on Sep. 27, 2012 including the specification, drawings and abstract is incorporated herein by reference in its entirety.

BACKGROUND OF THE INVENTION

1. Field of the Invention

The present invention relates generally to a vibration damping device for use in an automotive engine mount or the like. More particularly, the present invention pertains to a vibration damping device having stopper rubbers in which the stopper rubbers that constitute a stopper mechanism are attached to an outer bracket.

2. Description of the Related Art

Conventionally, vibration damping devices have been known as one type of vibration damping connecting components or vibration damping supports interposed between components that make up a vibration transmission system in order to provide vibration damping linkage between the components, and are employed as an automotive engine mount or the like. This type of vibration damping device includes: a first mounting member to be mounted onto one component of the vibration transmission system; a tubular second mounting member to be mounted onto the other component of the vibration transmission system; and a main rubber elastic body that elastically connects the first and second mounting members. The first mounting member is mounted onto a power unit and the second mounting member is mounted onto a vehicle body via an outer bracket, thereby providing vibration damping support of the power unit on the vehicle body.

Meanwhile, vibration damping devices may employ a stopper mechanism for limiting an amount of relative displacement between the first and second mounting members and preventing excessive deformation of the main rubber elastic body during input of large jarring load. This stopper mechanism is, for example, provided by contact between the first mounting member or an inner bracket attached to the first mounting member and the outer bracket attached to the second mounting member. In addition, a stopper rubber is interposed between the inner bracket and the outer bracket for reducing striking noises during their contact. For example, as disclosed in a vibration damping device having stopper rubbers of Japanese Unexamined Patent Publication No. JP-A-2012-087894, this stopper rubber is fitted onto the outer bracket and positioned so as to cover the contact face of the outer bracket against the inner bracket. This construction generally includes a plurality of stopper rubbers attached to the outer bracket so that the acting load during contact between the inner bracket and the outer bracket is dispersed over the circumference.

However, since the construction disclosed in JP-A-2012-087894 requires the plurality of stopper rubbers separated from each other, there may be an unavoidable problem of increase in the number of components. Particularly with the construction in which the stopper rubbers have mating recesses to be mated with the outer bracket, it is difficult to form the plurality of stopper rubbers in an integral manner. Therefore, it is a general practice to employ the stopper rubbers independent of each other.

SUMMARY OF THE INVENTION

It is therefore one object of this invention to provide a vibration damping device having stopper rubbers of novel construction which is able to provide a plurality of stopper rubbers to the outer bracket with a small number of parts.

Specifically, a first mode of the present invention provides a vibration damping device having stopper rubbers including: a first mounting member; a second mounting member; a main rubber elastic body elastically connecting the first and second mounting members; an outer bracket attached to the second mounting member; and a plurality of stopper rubbers attached to the outer bracket and providing a stopper mechanism for limiting an amount of relative displacement between the first and second mounting members by means of contact between a first mounting member side and the outer bracket via the stopper rubbers, wherein the stopper rubbers include respective mating recesses, and the mating recesses open toward a same direction, wherein the stopper rubbers are integrally formed by being connected by at least one rubber connecting portion, and wherein the stopper rubbers are attached to the outer bracket with the rubber connecting portion being deformed so that the mating recesses are arranged so as to open toward different directions and are mated with the outer bracket.

The vibration damping device having stopper rubbers according to the first mode is able to integrally form a plurality of stopper rubbers by connecting the stopper rubbers using the rubber connecting portion. In particular, with regard to the stopper rubbers having mating recesses for attachment to the outer bracket, it is possible to integrally form a plurality of stopper rubbers with a simple mold structure by forming the stopper rubbers such that the respective mating recesses open toward the same direction.

Moreover, by elastically deforming the rubber connecting portion formed of a rubber elastic body, the respective mating recesses of the stopper rubbers are allowed to face toward different directions with the stopper rubbers attached to the outer bracket. This makes it possible to desirably arrange and attach the plurality of stopper rubbers, which are integrally formed, to the outer bracket in a dispersed way, thereby permitting the stopper load to act dispersedly.

A second mode of the present invention provides the vibration damping device having stopper rubbers according to the first mode wherein the second mounting member has a tubular shape, wherein the outer bracket includes a mating tubular portion fitted externally onto the second mounting member, and wherein the mating recesses of the stopper rubbers are mated with an outside peripheral face of the mating tubular portion so that the stopper rubbers are attached to the outer bracket.

In the present invention, the plurality of stopper rubbers are attached to the outer bracket such that the respective mating recesses open toward different directions due to elastic deformation of the rubber connecting portion that connects the stopper rubbers to each other. Therefore, in the case where the stopper rubbers are attached to the mating tubular portion of the outer bracket as described in the second mode as well, it is possible to attach the plurality of stopper rubbers which are integrally formed at any places on the circumference of the mating tubular portion.

A third mode of the present invention provides the vibration damping device having stopper rubbers according to the first or second mode wherein the stopper rubbers comprise a pair of the stopper rubbers, and the pair of the stopper rubbers are attached to the outer bracket in opposition so that the mating recesses open so as to face each other.

According to the third mode, the pair of stopper rubbers arranged in opposition are connected to each other by the rubber connecting portion, so that relative displacement of the stopper rubbers away from each other in the direction of opposition is limited by the rubber connecting portion. Therefore, the mating recesses are less likely to be released from mating with the outer bracket, whereby the stopper rubbers are stably kept attached to the outer bracket.

A fourth mode of the present invention provides the vibration damping device having stopper rubbers according to any one of the first through third modes wherein a stopper protrusion is formed projecting from the outer bracket, and the mating recesses of the stopper rubbers are mated with the stopper protrusion.

According to the fourth mode, the stopper rubbers will be more securely mated with the outer bracket and prevented from misposition or disengagement. In particular, by making the shape of the stopper protrusion so as to correspond to the shape of the mating recesses, it is possible to obtain securing force more advantageously.

A fifth mode of the present invention provides the vibration damping device having stopper rubbers according to any one of the first through fourth modes wherein with the stopper rubbers attached to the outer bracket, the rubber connecting portion undergoes tensile deformation so that the stopper rubbers are pressed against the outer bracket due to elasticity of the rubber connecting portion.

According to the fifth mode, the stopper rubbers are held attached to the outer bracket based on elasticity of the rubber connecting portion. This will prevent disengagement of the stopper rubbers from the outer bracket. In particular, where the pair of stopper rubbers are arranged in opposition while being pressed against the outer bracket due to the elasticity of the rubber connecting portion, the direction of acting force based on the elasticity of the rubber connecting portion will approximately coincide with the direction of opening of the mating recesses. This allows the stopper rubbers to be stably kept attached.

A sixth mode of the present invention provides the vibration damping device having stopper rubbers according to the fifth mode wherein with the stopper rubbers in isolation prior to attachment to the outer bracket, the rubber connecting portion has slack.

According to the sixth mode, it is possible to ensure a great length of the rubber connecting portion while keeping the separation distance between the plurality of stopper rubbers small in the isolated state. Therefore, the components incorporating the plurality of stopper rubbers connected by the rubber connecting portion will require less space for transportation or storage.

A seventh mode of the present invention provides the vibration damping device having stopper rubbers according to any one of the first through sixth modes wherein the at least one rubber connecting portion comprises a plurality of rubber connecting portions, and the rubber connecting portions are spaced away from each other in parallel between the stopper rubbers.

According to the seventh mode, even the rubber connecting portion having relatively small cross sectional shape is able to stably hold the plurality of stopper rubbers in the desired connected state while dispersing the stress acting on the rubber connecting portions, thereby improving durability. In particular, where the stopper rubbers are attached to the mating tubular portion of the outer bracket and are pressed against the mating tubular portion due to the elasticity of the rubber connecting portion, by arranging the plurality of rubber connecting portions in parallel so as to be spaced away from each other in the circumferential direction of the mating tubular portion, the stopper rubbers will be pressed against the mating tubular portion in a balanced manner, thereby being stably held attached.

An eighth mode of the present invention provides the vibration damping device having stopper rubbers according to any one of the first through seventh modes wherein the stopper rubbers are formed of rubber only.

According to the eighth mode, the number of parts for forming the stopper rubbers will be minimized, thereby simplifying the construction. Moreover, the stopper rubbers can achieve reduced weight in comparison with those reinforced with a metal fitting, and are readily to deform. This makes it easy to mate and attach the stopper rubbers to the outer bracket.

According to the present invention, the plurality of stopper rubbers are integrally connected with each other by the rubber connecting portion. Therefore, the plurality of stopper rubbers can be integrally formed at one time while being easy to handle, store, transport, or the like. Furthermore, the plurality of stopper rubbers, which are integrally formed such that the mating recesses open toward the same direction, are arranged to be attached to the outer bracket by elastically deforming the rubber connecting portion so that the mating recesses open toward different directions. Thus, the integral formation of the plurality of stopper rubbers will impose no limitation as to the directions of attachment thereof, so that degree of freedom can be obtained with respect to attachment locations to the outer bracket.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
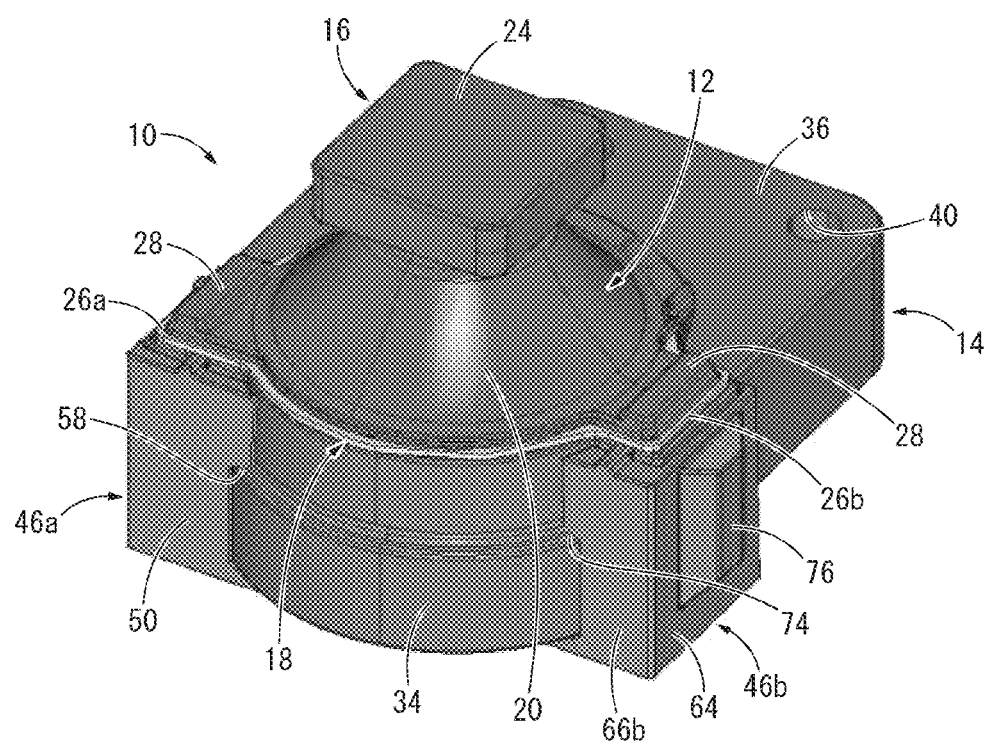
FIG. 1 is a perspective view of a vibration damping device in the form of an engine mount according to a first embodiment of the present invention.

Referring first to FIGS. 1 through 4, there is depicted an automotive engine mount 10 as a first embodiment of the vibration damping device having stopper rubbers constructed according to the present invention. The engine mount 10 includes a mount body 12 and an outer bracket 14 mounted onto the mount body 12. The mount body 12 has a construction in which a first mounting member 16 and a second mounting member 18 are elastically connected by a main rubber elastic body 20. The first mounting member 16 is mounted onto a power unit via an inner bracket 22, while the second mounting member 18 is mounted onto a vehicle body via the outer bracket 14 and installed in a vehicle, thereby providing vibration damping linkage of the power unit to the vehicle body. In the description hereinbelow, as a general rule, the vertical direction refers to the vertical direction in FIG. 4, which coincides with the axial direction of the engine mount 10. Also, as a general rule, the front-back direction refers to the vertical direction in FIG. 2, which coincides with the front-back direction of the vehicle.

Described more specifically, the first mounting member 16 is a high rigidity component formed of iron, aluminum alloy, fiber-reinforced synthetic resin or the like, and includes a thread portion 24 of generally rounded quadrangular plate shape. While omitted in the drawings, the first mounting member 16 has a screw hole that opens onto its upper surface, and the inner bracket 22 described later is adapted to be screw-fastened thereto.

Meanwhile, the second mounting member 18 is a high rigidity component like the first mounting member 16, and has a thin-walled, large-diameter, generally round tubular shape with a pair of flange portions 26a, 26b flaring peripherally outward from its upper end portion. It is desirable that the second mounting member 18 be of tubular shape, and other than the round tubular shape, various tubular shapes such as oval tubular shape, polygonal tubular shape or the like may preferably be employed.

The first mounting member 16 and the second mounting member 18 are coaxially disposed and elastically connected by the main rubber elastic body 20, thereby providing the mount body 12. The main rubber elastic body 20 has a thick-walled, large-diameter, generally frustoconical shape, and the small-diameter side end thereof is bonded by vulcanization to the first mounting member 16 while the outside peripheral face of the large-diameter side end thereof is bonded by vulcanization to the second mounting member 18. Thus, the main rubber elastic body 20 of the present embodiment takes the form of an integrally vulcanization molded component incorporating the first mounting member 16 and the second mounting member 18.

In addition, to the flange portions 26a, 26b of the second mounting member 18, a cushioning rubber 28, which is integrally formed with the main rubber elastic body 20, is bonded by vulcanization. The cushioning rubber 28 is bonded to the upper surface of the flange portions 26a, 26b so as to project upward therefrom, and has a generally rounded rectangular cross section. The cross-sectional area of the cushioning rubber 28 becomes progressively smaller towards its projecting distal end.

For the mount body 12, it is preferable to employ, for example, a fluid-filled vibration damping device such as disclosed in Japanese Unexamined Patent Publication No. JP-A-2008-196508. This fluid-filled vibration damping device includes: a pressure-receiving chamber whose wall is partially defined by the main rubber elastic body and is subject to pressure fluctuations at times of vibration input; an equilibrium chamber whose wall is partially defined by a flexible film and that permits change in volume, the pressure-receiving chamber and the equilibrium chamber being filled with a non-compressible fluid; and an orifice passage interconnecting the pressure-receiving chamber and the equilibrium chamber, for example. However, for the mount body, it is also possible to employ a solid type vibration damping device such as disclosed in Japanese Unexamined Patent Publication No. JP-A-2007-255530, which exhibits vibration damping effect utilizing energy attenuation action during elastic deformation of the main rubber elastic body.

Moreover, the inner bracket 22 is adapted to be mounted onto the mount body 12. The inner bracket 22 is a high rigidity component formed of metal or fiber-reinforced synthetic resin etc., and may include, for example, a gate-shaped member that extends with a slot-like cross section and a base plate member fixed to the lower end of the gate-shaped member. In the description hereinbelow, the inner bracket 22 has a construction as indicated by the chain double-dashed line in FIGS. 2 through 4, where a thick-walled rectangular plate member is perforated by a mount installation hole 30. The mount body 12 is positioned in the mount installation hole 30 and the first mounting member 16 is screw-fastened to the inner bracket 22, so that the inner bracket 22 is mounted onto the mount body 12.

With the inner bracket 22 mounted onto the mount body 12, the flange portions 26a, 26b of the second mounting member 18 are situated in opposition to the inside peripheral face of the inner bracket 22 with a given spacing therebetween. Thus, by contact between the flange portions 26a, 26b and the inner bracket 22, a bound stopper mechanism 32 is constituted for limiting an amount of relative displacement of the first mounting member 16 and the second mounting member 18 to get closer to each other in the axial direction. In the present embodiment, the flange portions 26a, 26b and the inner bracket 22 come into contact via the cushioning rubber 28, thereby reducing striking noises due to their contact.

To the mount body 12, the outer bracket 14 is attached. The outer bracket 14 is a high rigidity component formed of metal or fiber-reinforced synthetic resin etc., and integrally includes a mating tubular portion 34 of tubular shape and a mounting portion 36 extending peripherally outward from the mating tubular portion 34.

The mating tubular portion 34 has a stepped, generally round tubular shape with its diameter made smaller in the upper part rather than in the lower part, and is integrally provided with a pair of stopper protrusions 38a, 38b formed at locations opposite along an axis in the diametrical direction. The stopper protrusions 38a, 38b are protrusions projecting from the outside peripheral face of the mating tubular portion 34, and both have a generally rectangular block shape extending across the entire axial length of the mating tubular portion 34. Note that the stopper protrusion 38a has a greater width in the circumferential direction than does the stopper protrusion 38b.

The mounting portion 36 is a thick plate shape and projects from the lower end portion of the mating tubular portion 34 in the direction approximately orthogonal to the direction of opposition of the pair of stopper protrusions 38a, 38b. Additionally, the mounting portion 36 is perforated by a plurality of bolt holes 40 in the thickness direction.

The outer bracket 14 constructed in the above manner is attached to the mount body 12 by the mating tubular portion 34 being fitted externally onto the second mounting member 18. Besides, the flange portions 26a, 26b of the second mounting member 18 are superposed against the upper surface of the stopper protrusions 38a, 38b of the outer bracket 14, so that the flange portions 26a, 26b are reinforced with the stopper protrusions 38a, 38b. Load bearing capability against the bound stopper load is enhanced thereby.

Figure 2:
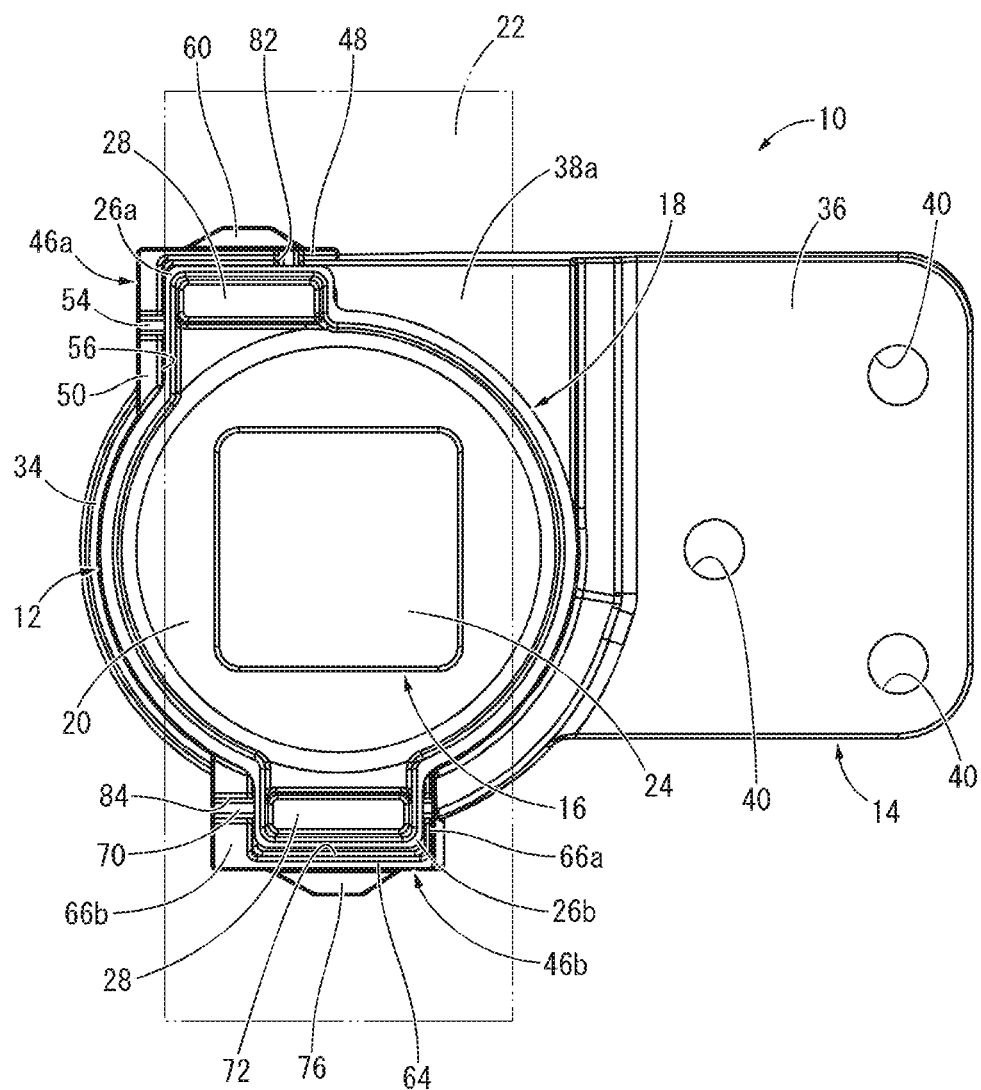
FIG. 2 is a top plane view of the engine mount shown in FIG. 1.
Figure 3:
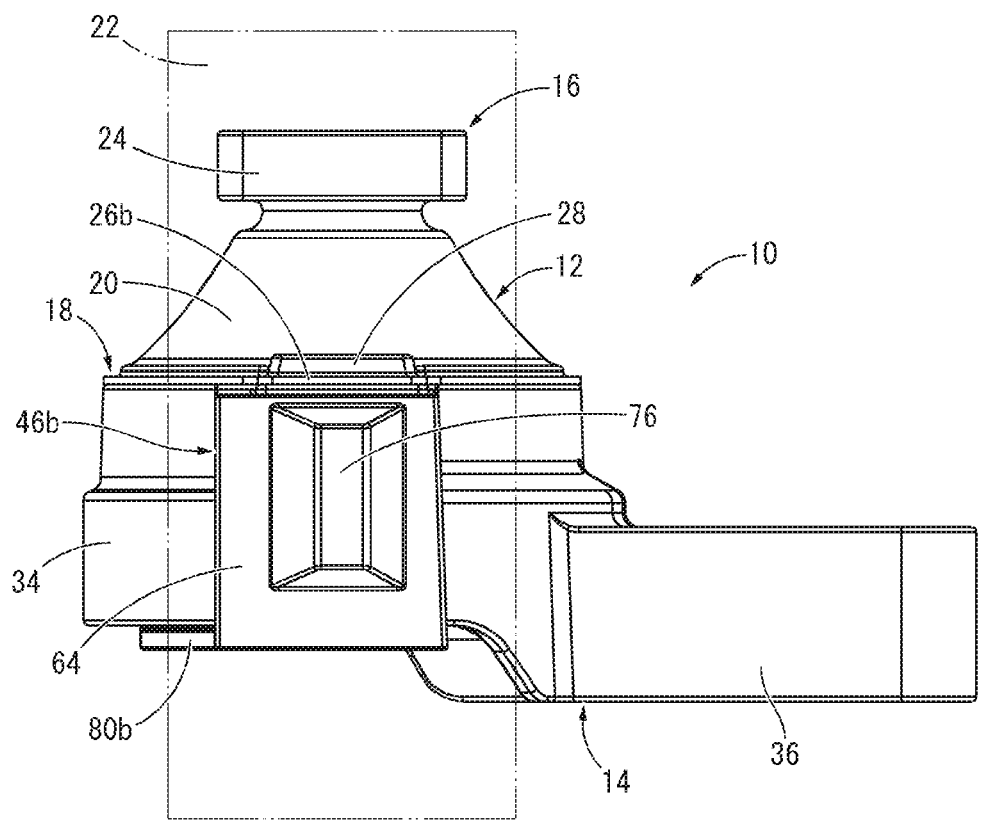
FIG. 3 is a front elevational view of the engine mount shown in FIG. 2.
Figure 4:
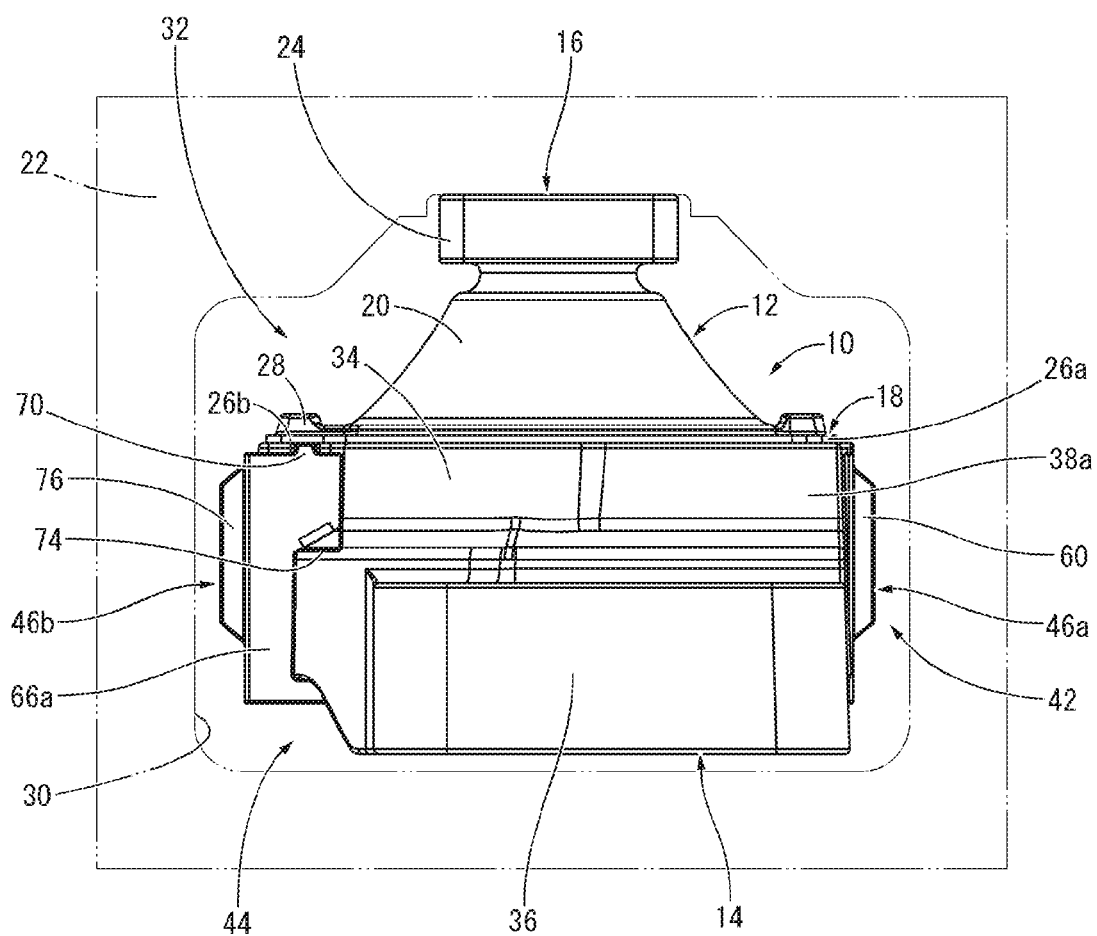
FIG. 4 is a right side view of the engine mount shown in FIG. 2.

Moreover, as depicted in FIG. 2, the inner bracket 22 extends in the direction of protrusion of the stopper protrusions 38a, 38b of the outer bracket 14 so as to straddle and be positioned outside the stopper protrusions 38a, 38b. Thus, by means of contact between the inner bracket 22 and the outside peripheral face of the stopper protrusions 38a, 38b, an axis-perpendicular stopper mechanism 42 is provided for limiting an amount of relative displacement between first mounting member 16 and the second mounting member 18 in the axis-perpendicular direction (the vehicle front-back direction). Furthermore, by means of contact between the inner bracket 22 and the lower surface of the stopper protrusions 38a, 38b, a rebound stopper mechanism 44 serving as a stopper mechanism is provided for limiting an amount of relative displacement between the first mounting member 16 and the second mounting member 18 away from each other in the axial direction.

Here, to the stopper protrusions 38a, 38b of the outer bracket 14, stopper rubbers 46a, 46b each formed of a rubber elastic body are attached, so that the inner bracket 22 and the stopper protrusions 38a, 38b are adapted to come into contact with each other via the stopper rubbers 46a, 46b.

Figure 5:
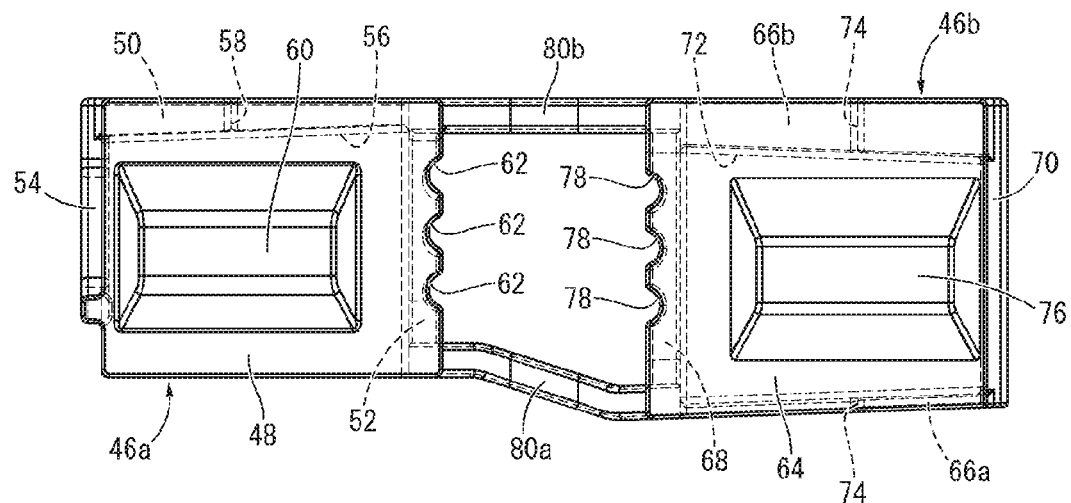
FIG. 5 is a bottom plane view of stopper rubbers of the engine mount shown in FIG. 2.
Figure 6:
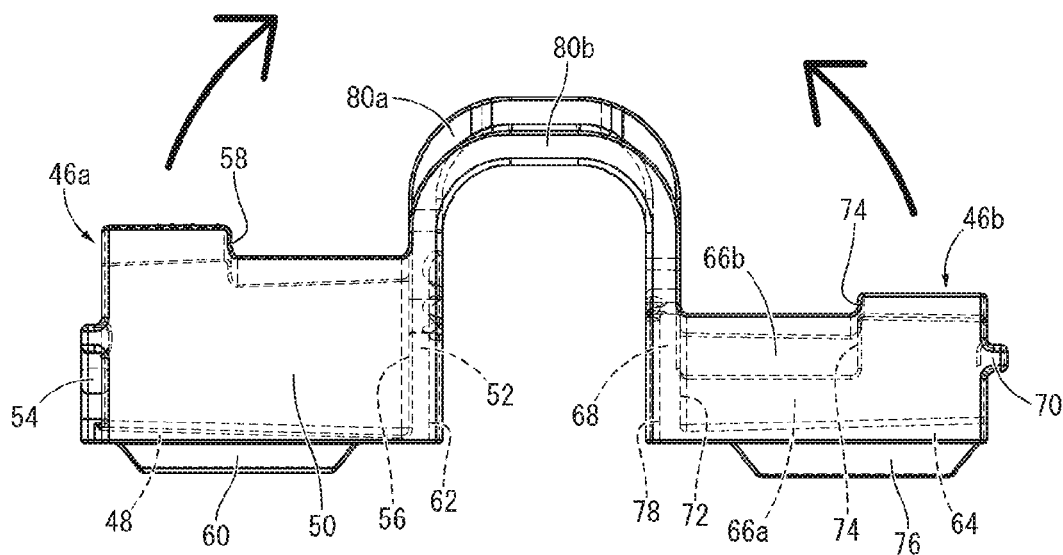
FIG. 6 is a front elevational view of the stopper rubbers shown in FIG. 5.
Figure 7:
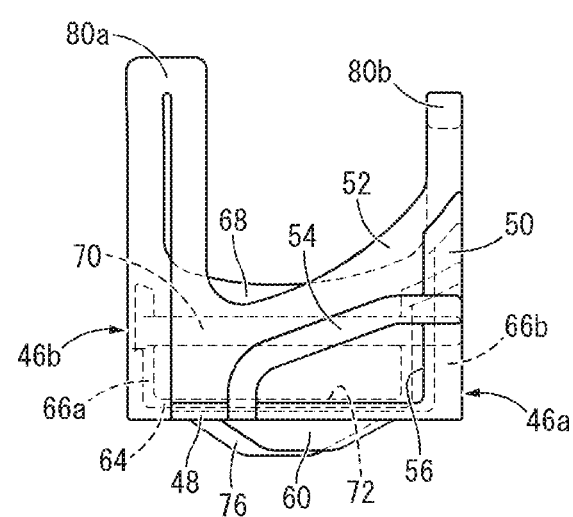
FIG. 7 is a left side view of the stopper rubbers shown in FIG. 6.

As depicted in FIGS. 5 through 7, the stopper rubber 46a integrally includes an outer wall 48 of generally rectangular plate shape, a side wall 50 orthogonally projecting from the end of the outer wall 48, and a bottom wall 52 projecting from the ends of the outer wall 48 and the side wall 50 so as to be orthogonal to both of them. In addition, at the end of the outer wall 48 and the side wall 50 opposite from the bottom wall 52, a constrained portion 54 is disposed in opposition to the bottom wall 52 so as to extend straddling the outer wall 48 and the side wall 50. Moreover, the stopper rubber 46a includes a mating recess 56 surrounded by the outer wall 48, the side wall 50, the bottom wall 52, and the constrained portion 54. As depicted in FIG. 6, the side wall 50 has a hook shoulder 58 at the opening end of the mating recess 56, so that the projecting dimension of the side wall 50 from the outer wall 48 is made larger on the constrained portion 54 side rather than on the bottom wall 52 side. Besides, the outer wall 48 integrally includes a cushion projection 60 which projects with tapered contours towards opposite side of the opening of the mating recess 56. Furthermore, the bottom wall 52 includes cushion grooves 62 on its outside surface. The cushion grooves 62 extend with generally semicircular cross section in the direction in which the mating recess 56 opens.

Meanwhile, the stopper rubber 46b integrally includes an outer wall 64 of generally rectangular plate shape, a pair of side walls 66a, 66b projecting from the two ends of the outer wall 64 so as to be approximately orthogonal to the outer wall 64, and a bottom wall 68 projecting from the ends of the outer wall 64 and the side walls 66a, 66b so as to be orthogonal to all of them. In addition, at the end of the outer wall 64 and the side walls 66a, 66b opposite from the bottom wall 68, a constrained portion 70 is disposed in opposition to the bottom wall 68 so as to extend straddling the pair of side walls 66a, 66b. Moreover, the stopper rubber 46b includes a mating recess 72 surrounded by the outer wall 64, the side walls 66a, 66b, the bottom wall 68, and the constrained portion 70. As depicted in FIG. 6, each of the side walls 66a, 66b has a hook shoulder 74 at the opening end of the mating recess 72, so that the projecting dimension of the side walls 66a, 66b from the outer wall 64 is made larger on the constrained portion 70 side rather than on the bottom wall 68 side. Besides, the outer wall 64 integrally includes a cushion projection 76 which projects with tapered contours towards opposite side of the opening of the mating recess 72. Furthermore, the bottom wall 68 includes cushion grooves 78 on its outside surface. The cushion grooves 78 extend with generally semicircular cross section in the direction in which the mating recess 72 opens.

The stopper rubber 46a and the stopper rubber 46b of construction as described above are positioned adjacent to each other so that the mating recess 56 of the stopper rubber 46a and the mating recess 72 of the stopper rubber 46b open toward the same direction. The bottom wall 52 of the stopper rubber 46a and the bottom wall 68 of the stopper rubber 46b are arranged in opposition at a given distance.

It should be appreciated that the stopper rubber 46a and the stopper rubber 46b are integrally formed with each other by being connected by rubber connecting portions 80a, 80b. The rubber connecting portions 80a, 80b have a band shape or pillar shape, and are integrally formed with the stopper rubbers 46a, 46b by straddling the bottom walls 52, 68 on the opening side of the mating recesses 56, 72. In the present embodiment, the rubber connecting portion 80a and the rubber connecting portion 80b having mutually different shapes are arranged in parallel at a distance from each other between the stopper rubbers 46a, 46b. Besides, the rubber connecting portion 80a and the rubber connecting portion 80b are provided on the end of the bottom wall 68 of the stopper rubber 46b at the positions where the side walls 66a, 66b are opposed to each other. Thus, the distance between the rubber connecting portion 80a and the rubber connecting portion 80b is greatly obtained.

Additionally, both the rubber connecting portions 80a, 80b curve in an approximate form of a U so as to be convex in the direction of opening of the mating recesses 56, 72, so as to have sufficient slack in that direction. In the present embodiment, in the attached state to the outer bracket 14 described later, the rubber connecting portion 80a has a longer path than the rubber connecting portion 80b. Therefore, as depicted in FIG. 6, the rubber connecting portion 80a projects greater than does the rubber connecting portion 80b in the direction of opening of the mating recesses 56, 72.

Note that the stopper rubbers 46a, 46b and the rubber connecting portions 80a, 80b are integrally formed of a rubber elastic body. In this respect, the mating recess 56 of the stopper rubber 46a and the mating recess 72 of the stopper rubber 46b open to the same direction (upward in FIG. 6). Thus, by using a mold for vulcanization molding to be divided in the vertical direction in FIG. 6, it is possible to form an integrally molded component incorporating these stopper rubbers 46a, 46b and the rubber connecting portions 80a, 80b with a simple mold structure composed of a small number of divisions. Moreover, in the present embodiment, the direction of protrusion of the cushion projections 60, 76 and the groove direction of the cushion grooves 62, 78 are also the vertical direction in FIG. 6. This arrangement makes it possible to avoid mold release failure with respect to parting in the vertical direction in FIG. 6.

Figure 8:
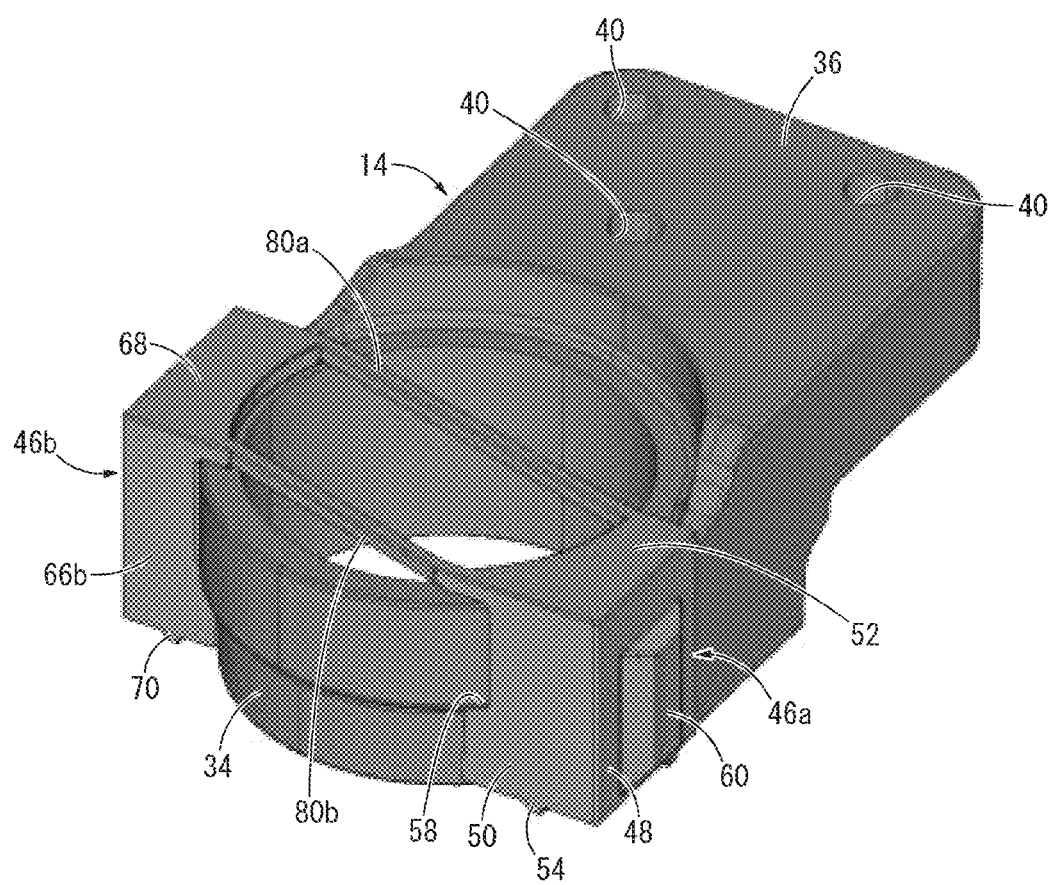
FIG. 8 is a perspective view of an outer bracket to which the stopper rubbers shown in FIG. 5 are attached.

The stopper rubbers 46a, 46b integrally connected with each other by the rubber connecting portions 80a, 80b in this way are attached to the outer bracket 14. Specifically, as shown by arrows in FIG. 6, with the rubber connecting portions 80a, 80b being elastically deformed, the stopper rubbers 46a, 46b are rotated relative to each other and situated in opposition so that the mating recesses 56, 72 open so as to face each other. Concurrently, or thereafter, the mating recesses 56, 72 are respectively mated with the stopper protrusions 38a, 38b of the outer bracket 14. By so doing, as depicted in FIG. 8, the stopper rubbers 46a, 46b situated in opposition are attached to the stopper protrusions 38a, 38b that constitute the outside peripheral face of the mating tubular portion 34. In the present embodiment, the stopper rubbers 46a, 46b are both formed of rubber only without including any rigid member for reinforcement purposes. Thus, the stopper rubbers 46a, 46b are permitted elastic deformation in their entirety, and are readily attachable to the stopper protrusions 38a, 38b. Additionally, by the hook shoulders 58, 74 of the stopper rubbers 46a, 46b coming into contact with the shoulder portion of the mating tubular portion 34, the stopper rubbers 46a, 46b are vertically positioned at their inner peripheral edges.

Figure 9:
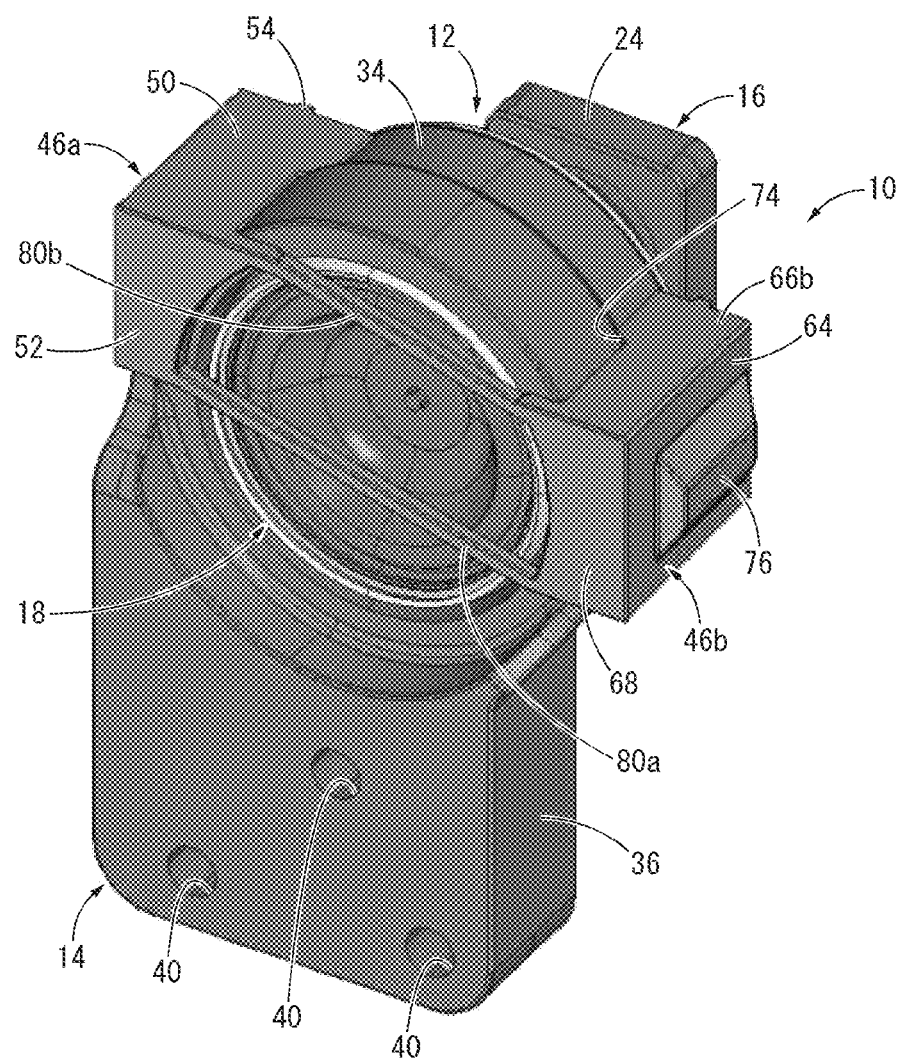
FIG. 9 is a perspective view of a bottom face side of the engine mount shown in FIG. 1.

Furthermore, as depicted in FIG. 8, with the stopper rubbers 46a, 46b attached to the outer bracket 14, the rubber connecting portions 80a, 80b extend straddling the lower opening of the mating tubular portion 34 of the outer bracket 14. In this respect, when the stopper rubbers 46a, 46b are attached to the outer bracket 14, the rubber connecting portions 80a, 80b having slack in a form of a U undergo tensile deformation and extend in a generally straight line. Accordingly, the outer walls 48, 64 of the stopper rubbers 46a, 46b are pressed against the stopper protrusions 38a, 38b due to elasticity of the rubber connecting portions 80a, 80b. With this arrangement, the mating recesses 56, 72 are effectively kept mated with the stopper protrusions 38a, 38b, thereby preventing detachment of the stopper rubbers 46a, 46b from the stopper protrusions 38a, 38b. In the present embodiment, as depicted in FIG. 9, with the outer bracket 14 fastened externally onto the mount body 12, the lower end of the mount body 12 is housed within the mating tubular portion 34 of the outer bracket 14 without projecting from the lower end thereof, so that the rubber connecting portions 80a, 80b extend without being pressed by the mount body 12.

Figure 10:
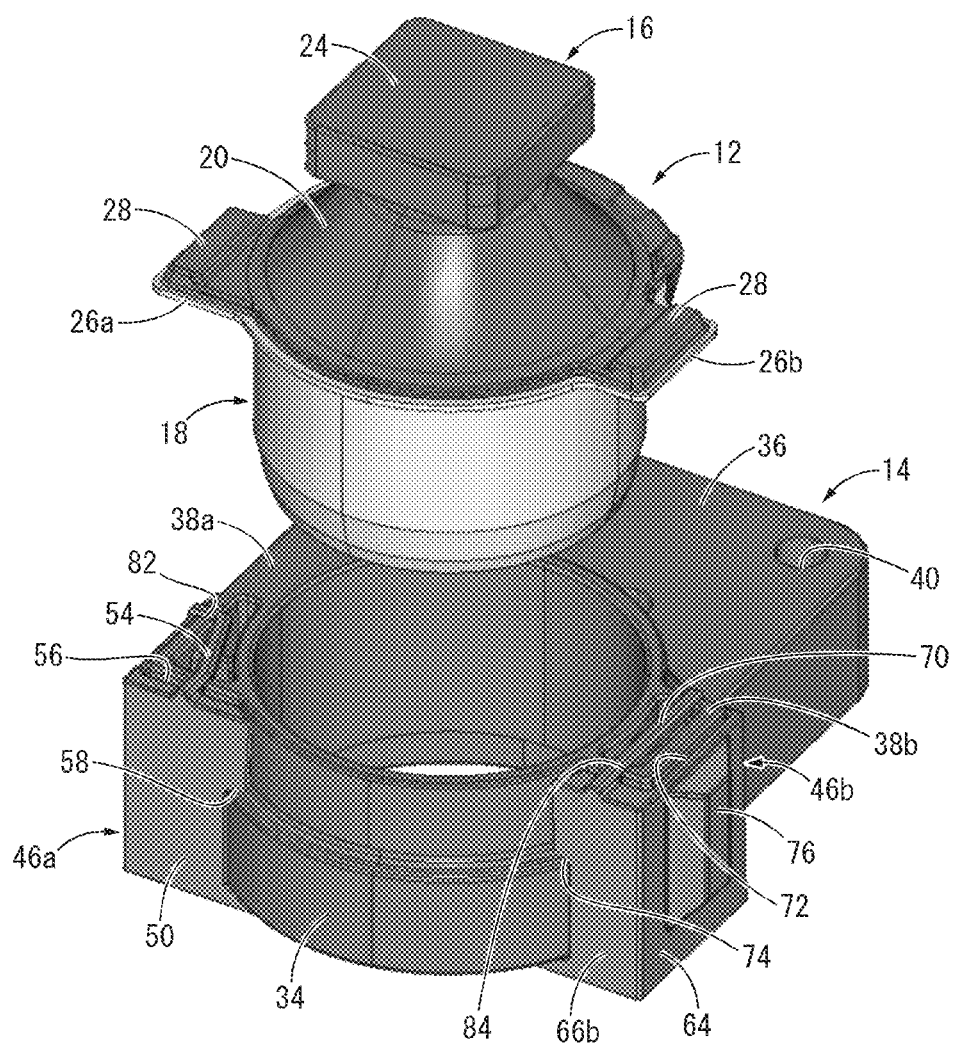
FIG. 10 is a perspective view showing a step of attaching a mount body to the outer bracket, which is one of manufacturing processes of the engine mount shown in FIG. 1.

Moreover, as depicted in FIG. 10, the stopper protrusion 38a includes at its upper surface a mating groove 82, and the stopper protrusion 38b includes at its upper surface a mating groove 84. Accordingly, the constrained portion 54 is fitted into the mating groove 82 while the constrained portion 70 is fitted into the mating groove 84. This arrangement prevents detachment of the stopper rubbers 46a, 46b from the stopper protrusions 38a, 38b, whereby the stopper rubbers 46a, 46b are held positioned with respect to the stopper protrusions 38a, 38b.

With the stopper rubbers 46a, 46b installed as above, the axis-perpendicular stopper mechanism 42 and the rebound stopper mechanism 44 are arranged such that the inner bracket 22 and the outer bracket 14 come into contact via the stopper rubbers 46a, 46b, thereby reducing contact noises. Particularly in the present embodiment, the stopper rubbers 46a, 46b include the cushion projections 60, 76 on the outer walls 48, 64, and the cushion grooves 62, 78 on the bottom walls 52, 68. Striking noises during contact will be more effectively reduced thereby.

Figure 11:
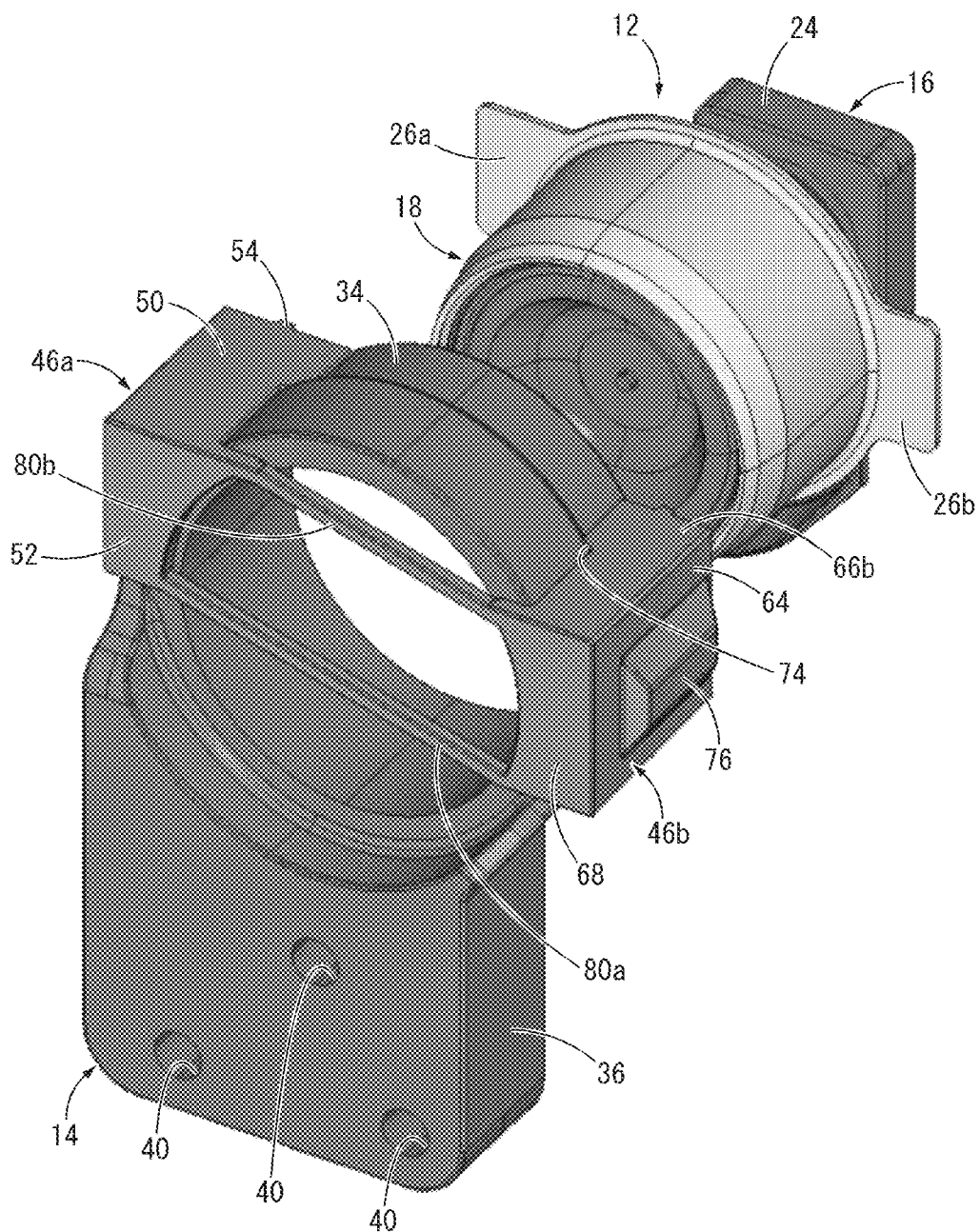
FIG. 11 is a perspective view of the bottom face side showing the step of attaching the mount body to the outer bracket shown in FIG. 10.

Note that as depicted in FIGS. 10 and 11, the mount body 12 is adapted to be secured press-fit into the outer bracket 14 to which the stopper rubbers 46a, 46b are attached. Accordingly, the openings of the mating grooves 82, 84 are covered by the flange portions 26a, 26b of the second mounting member 18, making it possible to prevent the constrained portions 54, 70 from being disengaged from the mating grooves 82, 84, and hence effectively prevent detachment of the stopper rubbers 46a, 46b from the stopper protrusions 38a, 38b.

In addition, the inner bracket 22 is attached to the engine mount 10 constructed such that the outer bracket 14 incorporating the stopper rubbers 46a, 46b is fitted externally onto the mount body 12. As will be apparent from the above description, the inner bracket 22 is not an element of the engine mount 10 according to the present embodiment, but can be omitted. If the inner bracket 22 is omitted, the stopper mechanism is provided by, for example, changing the shape of the first mounting member so that the first mounting member and the outer bracket 14 come into contact with each other.

In the engine mount 10 of this construction according to the present embodiment, the plurality of stopper rubbers 46a, 46b are integrally connected with each other by the rubber connecting portions 80a, 80b, thereby being provided as a single component overall. Therefore, the number of parts can be reduced, thus making the attaching of the stopper rubbers 46a, 46b to the outer bracket 14 easier. Besides, storage, management, transportation or the like of the components also become easier.

Moreover, the stopper rubbers 46a, 46b are integrally connected with each other by the rubber connecting portions 80a, 80b with the mating recesses 56, 72 arranged so as to open toward generally the same direction. This arrangement will avoid troubles such as failure in removing the mold for molding from the mating recesses 56, 72.

Furthermore, when the stopper rubbers 46a, 46b are attached to the outer bracket 14, the directions of opening of the mating recesses 56, 72 can be made different by deforming the rubber connecting portions 80a, 80b. Therefore, it is not necessary to align the directions of attaching of the stopper rubbers 46a, 46b to the outer bracket 14 with each other, and the stopper rubbers 46a, 46b can be attached, for example, in opposition to each other. It would also be acceptable to arrange the stopper rubbers 46a, 46b rotated relative to each other with the directions of opening of their mating recesses retained in the same direction, while appropriately modifying the shapes of the rubber connecting portions 80a, 80b. By so doing, it is possible to easily deal with any requirement regarding the directions of attachment of the stopper rubbers 46a, 46b.

Also, in the present embodiment, a pair of the stopper rubbers 46a, 46b are mated and attached to the outside peripheral face of the mating tubular portion 34 of the outer bracket 14, and the pair of stopper rubbers 46a, 46b are positioned in opposition to each other. Since the pair of stopper rubbers 46a, 46b positioned in this way are connected by the rubber connecting portions 80a, 80b in the direction of opposition, displacement of the stopper rubbers 46a, 46b in the direction of opposition away from each other is limited. Accordingly, the pair of stopper rubbers 46a, 46b are prevented from disengagement from the outer bracket 14 due to their relative displacement, and are stably kept attached thereto.

Besides, with the stopper rubbers 46a, 46b attached to the outer bracket 14, the rubber connecting portions 80a, 80b undergo tensile deformation, so that the stopper rubbers 46a, 46b are pressed against the outer bracket 14 due to elasticity of the rubber connecting portions 80a, 80b. Thus, disengagement of the stopper rubbers 46a, 46b from the outer bracket 14 will be more effectively prevented, thereby maintaining the attached state.

Additionally, in the present embodiment, with the stopper rubbers 46a, 46b in isolation prior to attachment to the outer bracket 14, the rubber connecting portions 80a, 80b are provided so as to curve in a form of a U and have slack. Therefore, the distance between the stopper rubbers 46a, 46b in the isolated state is sufficiently made smaller than the distance between the opposed stopper rubbers 46a, 46b in the attached state to the outer bracket 14, whereby the integrally vulcanization molded component of the stopper rubbers 46a, 46b can be obtained with compact size.

Moreover, the rubber connecting portions 80a, 80b are spaced away from each other in parallel in the circumferential direction of the mating tubular portion 34 between the pair of stopper rubbers 46a, 46b. With this arrangement, biased elastic force of the rubber connecting portions 80a, 80b is prevented from acting on the stopper rubbers 46a, 46b, thereby avoiding disengagement or deviation in the circumferential direction of the stopper rubbers 46a, 46b. Especially in the present embodiment, the rubber connecting portions 80a, 80b are provided at the opposite ends of the stopper rubbers 46a, 46b. Thus, the stopper rubbers 46a, 46b are pressed against the outer bracket 14 at their opposite ends, so as to be stably attached thereto. In addition, when the stopper rubbers 46a, 46b are integrally formed, in the cavity of mold for vulcanization molding, a flow of the rubber material will be efficiently permitted between the formation zones of the stopper rubbers 46a, 46b through the formation zones of the rubber connecting portions 80a, 80b. Molding defects can be advantageously prevented thereby.

Furthermore, the mating tubular portion 34 of the outer bracket 14 includes the stopper protrusions 38a, 38b, and the stopper rubbers 46a, 46b are superposed against and mated with the respective stopper protrusions 38a, 38b. Therefore, the stopper rubbers 46a, 46b are less likely to be detached from the outer bracket 14, and are stably retained in the intended attached state. Besides, by providing the stopper protrusions 38a, 38b of generally rectangular shape, each of the bound stopper mechanism 32, the rebound stopper mechanism 44, and the axis-perpendicular stopper mechanism 42 can obtain a large contact area, thereby effectively limiting displacement of the components.

An embodiment of the present invention has been described in detail above, but the present invention is not limited to those specific descriptions. For example, the number of the stopper rubbers is not necessarily limited to two, but may be three or more.

Also, it is not essential for the stopper rubbers, under the attached state to the outer bracket, to be situated in opposition in pairs such that the mating recesses face to each other. For example, the stopper rubbers may be arranged such that the directions of opening of the mating recesses are generally orthogonal to each other.

Besides, the stopper rubbers are not necessarily limited to the construction incorporating the outer wall, the side wall, the bottom wall, and the constrained portion which are distinctly segmented, but may alternatively have a construction in which the outer wall and the side wall are constituted by a continuous tubular wall.

Moreover, the stopper rubbers are not limited to those formed of rubber only. For example, a rigid member for reinforcement purposes may be anchored to the stopper rubbers so as to limit deformation thereof, thus preventing disengagement after attachment.

As to the rubber connecting portions, three or more rubber connecting portions may be provided and spaced away from one another in a parallel arrangement, or alternatively, only a single rubber connecting portion having a wide plate shape may be provided.

Also, the shape of the rubber connecting portion having slack is not always limited to a U shape, but may extend in a wavy form or a zigzag form, for example. In addition, whereas it is desirable that the rubber connecting portion have slack in order to make the distance between the stopper rubbers small in the isolated state, the rubber connecting portion does not necessarily have slack, but may extend in a straight line between the stopper rubbers.

Furthermore, the rubber connecting portions are not limited to the construction that connects the bottom walls of the plurality of stopper rubbers, but may be provided so as to connect the side walls of the stopper rubbers, for example.

It is not essential for the outer bracket to have the mating tubular portion, and the stopper rubbers are not necessarily limited to those attached to the outside peripheral face of the mating tubular portion.

It would also be acceptable to omit the stopper protrusion formed projecting from the outside peripheral face of the mating tubular portion. For example, the mating recess of the stopper rubber may have a round tubular concave shape that corresponds to the outside peripheral face of the mating tubular portion and be directly mated with the outside peripheral face of the mating tubular portion.

Additionally, the mount body is not limited to the vibration damping device of bowl design such as shown in the preceding embodiment, but may employ a cylindrical vibration-damping device having a construction in which an outer cylindrical member is externally fitted onto an inner shaft member and a main rubber elastic body elastically connects the inner shaft member and the outer cylindrical member.

What is claimed is:

1. A vibration damping device comprising:
   a first mounting member;
   a second mounting member;
   a main rubber elastic body elastically connecting the first and second mounting members;
   an outer bracket attached to the second mounting member; and
   a plurality of stopper rubbers attached to the outer bracket and providing a stopper mechanism for limiting an amount of relative displacement between the first and second mounting members by contact between a first mounting member side and the outer bracket via the stopper rubbers, wherein
   the stopper rubbers include respective mating recesses that open toward a same direction,
   the stopper rubbers are integrally connected by at least one rubber connecting portion, and
   the stopper rubbers are attached to the outer bracket with the rubber connecting portion being deformed so that the mating recesses are arranged so as to open toward different directions and are mated with the outer bracket.

2. The vibration damping device according to claim 1, wherein the second mounting member has a tubular shape, wherein the outer bracket includes a mating tubular portion fitted externally onto the second mounting member, and wherein the mating recesses of the stopper rubbers are mated with an outside peripheral face of the mating tubular portion so that the stopper rubbers are attached to the outer bracket.

3. The vibration damping device according to claim 1, wherein the stopper rubbers comprise a pair of the stopper rubbers, and the pair of the stopper rubbers are attached to the outer bracket in opposition so that the mating recesses open so as to face each other.

4. The vibration damping device according to claim 1, wherein a stopper protrusion is formed projecting from the outer bracket, and the mating recesses of the stopper rubbers are mated with the stopper protrusion.

5. The vibration damping device according to claim 1, wherein with the stopper rubbers attached to the outer bracket, the rubber connecting portion undergoes tensile deformation so that the stopper rubbers are pressed against the outer bracket due to elasticity of the rubber connecting portion.

6. The vibration damping device according to claim 5, wherein with the stopper rubbers in isolation prior to attachment to the outer bracket, the rubber connecting portion has slack.

7. The vibration damping device according to claim 1, wherein the at least one rubber connecting portion comprises a plurality of rubber connecting portions, and the rubber connecting portions are spaced away from each other in parallel between the stopper rubbers.

8. The vibration damping device according to claim 1, wherein the stopper rubbers are formed of rubber only.

9. The vibration damping device according to claim 7, wherein each of the plurality of rubber connecting portions include first and second ends that define the integral connection with the stopper rubbers at respective bottom walls of the stopper rubbers.

10. The vibration damping device according to claim 1, wherein the stopper rubbers comprise a pair of the stopper rubbers, and the pair of the stopper rubbers are attached to the outer bracket in opposition so that the mating recesses open so as to face each other,
   the rubber connecting portion includes first and second ends that define the integral connection with the pair of stopper rubbers at respective bottom walls of the stopper rubbers, and
   with the pair of the stopper rubbers attached to the outer bracket, the rubber connecting portion undergoes tensile deformation so that the stopper rubbers are pressed against the outer bracket due to elasticity of the rubber connecting portion.

11. A vibration damping device comprising:
   a first mounting member;
   a second mounting member;
   a main elastic body elastically connecting the first and second mounting members;
   an outer bracket attached to the second mounting member; and
   a plurality of elastic stoppers attached to the outer bracket and providing a stopper mechanism for limiting an amount of relative displacement between the first and second mounting members by contact between a first mounting member side and the outer bracket via the elastic stoppers, wherein
   the elastic stoppers include respective mating recesses that open toward a same direction,
   the elastic stoppers are integrally connected by at least one elastic connecting portion, and
   the elastic stoppers are attached to the outer bracket with the elastic connecting portion being deformed so that the mating recesses are arranged so as to open toward different directions and are mated with the outer bracket.

* * * * *